United States Patent
Kweon et al.

(10) Patent No.: US 9,759,142 B2
(45) Date of Patent: Sep. 12, 2017

(54) FUEL IGNITION QUALITY DETECTION SYSTEMS AND METHODS

(75) Inventors: Chol-Bum M. Kweon, Rochester, MI (US); Frederic Anton Matekunas, Troy, MI (US); Ibrahim Haskara, Macomb, MI (US); Yue-Yun Wang, Troy, MI (US); Ognyan N. Yanakiev, Canton, MI (US); Donald Terry French, Warren, MI (US); Paul Anthony Battiston, Clinton Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 944 days.

(21) Appl. No.: 12/400,256

(22) Filed: Mar. 9, 2009

(65) Prior Publication Data

US 2010/0228463 A1    Sep. 9, 2010

(51) Int. Cl.
*F02D 41/00*    (2006.01)
*F02D 35/02*    (2006.01)
(Continued)

(52) U.S. Cl.
CPC ....... *F02D 41/0025* (2013.01); *F02D 19/061* (2013.01); *F02D 19/0636* (2013.01); *F02D 19/0649* (2013.01); *F02D 35/023* (2013.01); *F02D 35/025* (2013.01); *F02D 35/027* (2013.01); *F02D 41/401* (2013.01); *F02D 41/403* (2013.01); *F02D 2200/0612* (2013.01); *Y02T 10/36* (2013.01); *Y02T 10/44* (2013.01)

(58) Field of Classification Search
USPC ........ 123/406.16, 406.21, 406.29, 304, 575; 701/103, 104; 73/35.01, 35.02
See application file for complete search history.

(56) References Cited

U.S. PATENT DOCUMENTS 3,469,954 A * 9/1969 Hoffman .................... 137/88
3,575,039 A * 4/1971 Beal .......................... 73/35.02
(Continued)

FOREIGN PATENT DOCUMENTS

CN       101598075 A       12/2009
DE    102007048650 A1     4/2009
(Continued)

OTHER PUBLICATIONS

Eng, J.A.; "Characterization of Pressure Waves in HCCI Combustion;" Copyright 2002 Society of Automotive Engineers, Inc., Powertrain & Fluid Systems Conference & Exhibition San Diego, California USA Oct. 21-24, 2002, 2002-01-2859; 15 pages.

(Continued)

*Primary Examiner* — Sizo Vilakazi

(57) ABSTRACT

An engine control system includes an engine calibration module that sets fuel injection timing based on one of N cetane number (CN) values, wherein N is an integer greater than one. A combustion noise module generates a combustion noise signal based on cylinder pressure in a compression ignition (CI) engine during combustion. A fuel quality determination module compares the combustion noise signal to N predetermined combustion noise levels corresponding to the N CN values, and that selects the one of the N CN values based on the comparison.

26 Claims, 11 Drawing Sheets

(51) Int. Cl.
*F02D 41/40* (2006.01)
*F02D 19/06* (2006.01)

(56) References Cited

U.S. PATENT DOCUMENTS

| | | | |
|---|---|---|---|
| 4,010,358 A * | 3/1977 | Morris | 702/30 |
| 4,402,212 A * | 9/1983 | Childs | 73/35.02 |
| 4,567,751 A | 2/1986 | Ootsuka et al. | |
| 5,052,214 A * | 10/1991 | Dils | 73/35.04 |
| 5,131,370 A * | 7/1992 | Chikamatsu et al. | 123/406.32 |
| 5,392,745 A | 2/1995 | Beck | |
| 5,457,985 A | 10/1995 | Cellier et al. | |
| 5,469,830 A * | 11/1995 | Gonzalez | 123/515 |
| 5,633,798 A * | 5/1997 | Kopp | 701/111 |
| 6,609,413 B1 | 8/2003 | De Craecker | |
| 7,266,439 B2 | 9/2007 | Wang et al. | |
| 8,150,596 B2 | 4/2012 | Kweon et al. | |
| 2004/0261414 A1* | 12/2004 | Araki | 60/602 |
| 2007/0151542 A1* | 7/2007 | Yamaguchi et al. | 123/299 |
| 2007/0175268 A1* | 8/2007 | Honda | 73/35.04 |
| 2008/0221780 A1* | 9/2008 | Ishikawa | 701/104 |
| 2009/0082940 A1* | 3/2009 | Ishizuka et al. | 701/103 |
| 2009/0299605 A1 | 12/2009 | Kweon et al. | |

FOREIGN PATENT DOCUMENTS

| | | | |
|---|---|---|---|
| DE | 102207049705 A1 | 4/2009 | |
| EP | 1775584 A2 | 4/2007 | |
| JP | 09158819 A * | 6/1997 | F02P 5/152 |
| JP | 2006-016994 | 1/2006 | |

OTHER PUBLICATIONS

Polonowski, Christopher J. et al., "Accelerometer Based Sensing of Combustion in a High Speed HPCR Diesel Engine," SAE Technical Paper Series, 2007-01-0972, 2007 World Congress, Apr. 16-19, 2007, 18 pages.

* cited by examiner

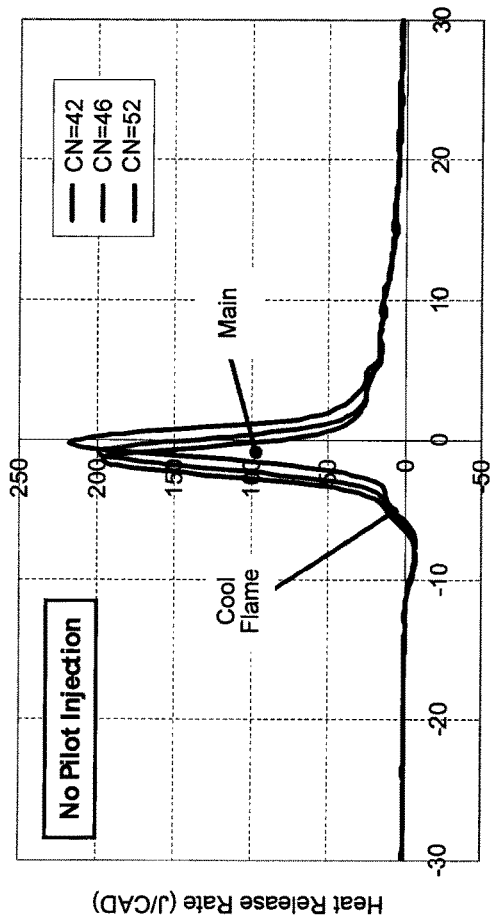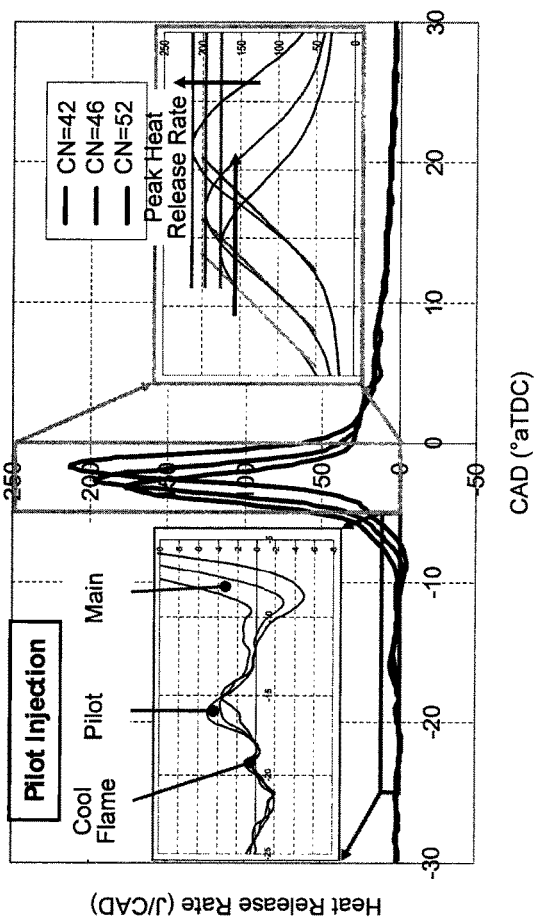

FUEL IGNITION QUALITY DETECTION SYSTEMS AND METHODS

FIELD

The present disclosure relates to engine fuel detection and control and more particularly to engine fuel detection systems and methods and engine control systems for compression ignition (CI) engines.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Compression ignition (CI) engines include diesel engines and homogenous charge compression ignition (HCCI) engines. In CI engines, a piston compresses an air/fuel (A/F) mixture in a cylinder to combust the A/F mixture. Typically, a constant amount of air is drawn into a CI engine (as opposed to a throttled air intake in a spark-ignition engine). In other words, the A/F mixture in a CI engine (and thus the output power) is controlled by the amount of fuel that is injected.

In addition to a different combustion process, CI engine systems also use different types of fuel. Cetane number (CN) is a measurement of the ignition or combustion quality of CI fuel during compression ignition. In particular, CN affects an ignition delay of CI fuel. The ignition delay is defined as the time period between the start of injection of fuel into a CI engine and the start of combustion of the A/F mixture in the CI engine. CI fuels with higher CNs tend to have shorter ignition delays (and therefore less time for the A/F mixture to form) than CI fuels with lower CNs.

CI fuel may be found with a wide range of CNs. For example, different countries require different minimum CNs. CI fuel quality at different service stations may also vary. Operating a CI engine on CI fuel with a different CN than it is calibrated for may adversely affect, for example, combustion efficiency, exhaust pressure, boost pressure, exhaust gas recirculation (EGR), A/F ratio, emissions, and/or noise/vibration/harshness (NVH).

SUMMARY

An engine control system includes an engine calibration module, a combustion noise module, and a fuel quality determination module. The engine calibration module sets fuel injection timing based on one of N cetane number (CN) values, wherein N is an integer greater than one. The combustion noise module generates a combustion noise signal based on cylinder pressure in a compression ignition (CI) engine during combustion. The fuel quality determination module compares the combustion noise signal to N predetermined combustion noise levels corresponding to the N CN values, and that selects the one of the N CN values based on the comparison.

A method includes setting fuel injection timing based on one of N cetane number (CN) values, wherein N is an integer greater than one, generating a combustion noise signal based on cylinder pressure in a compression ignition (CI) engine during combustion, comparing the combustion noise signal to N predetermined combustion noise levels corresponding to the N CN values, and selecting the one of the N CN values based on the comparison.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIGS. 4A and 4B are graphs illustrating a heat release rate as a function of a crank angle degree after top dead center (aTDC), both with and without pilot injection, for three CI fuels with different cetane numbers (CNs), according to the present disclosure;

DETAILED DESCRIPTION

Figure 1:
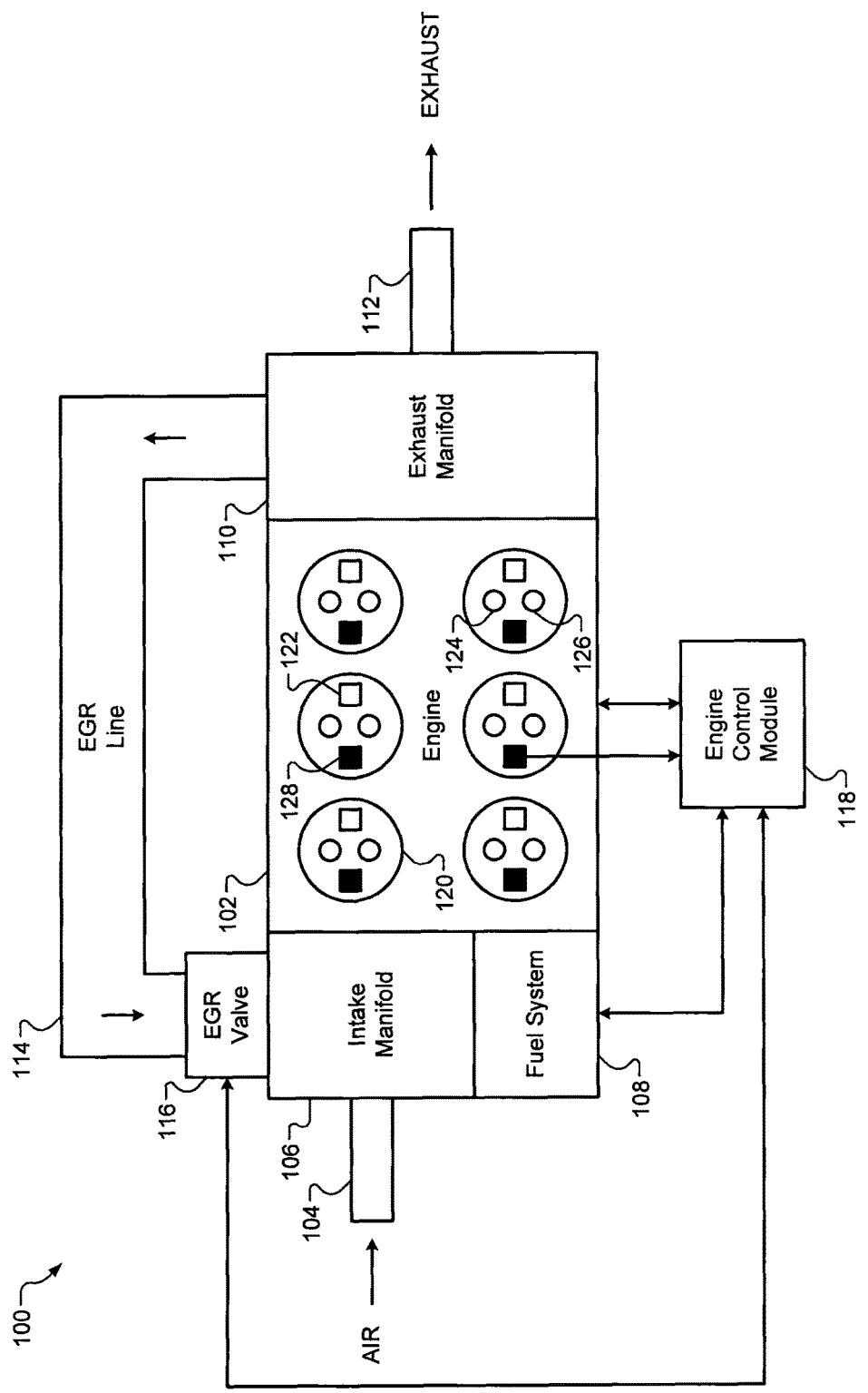
FIG. 1 is a functional block diagram of a compression ignition (CI) engine system according to the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

Referring now to FIG. 1, a compression ignition (CI) engine system 100 is shown. A CI engine 102 combusts an air/fuel (A/F) mixture to produce drive torque. The CI engine system 100 further includes an inlet 104, an intake manifold 106, a fuel system 108, an exhaust manifold 110, an outlet 112, an exhaust gas recirculation (EGR) line 114, an EGR valve 116, and an engine control module 118. The CI engine 102 includes cylinders 120, fuel injectors 122, intake valves 124, exhaust valves 126, and sensors 128.

Air is drawn into the intake manifold 106 through the inlet 104. Air within the intake manifold 106 is distributed into the cylinders 120. Although FIG. 1 depicts six cylinders, it should be appreciated that the CI engine 102 may include additional or fewer cylinders. For example, engines having 3, 4, 5, 8, 10, 12 and 16 cylinders are also contemplated.

The fuel system 108 includes a fuel pump (not shown) to pressurize fuel and a fuel rail (not shown) to deliver fuel to the fuel injectors 122. The fuel injectors 122 are operated by commanding an energizing time. For example only, an amount of fuel injection may be based on a fuel rail pressure, the energizing time, and/or fuel injector construction. For example only, timing of fuel injection may be based on a position of pistons (not shown) within the cylinders 120 (i.e. a crank angle) when the fuel injectors 122 start to operate.

The engine control module 118 communicates with components of the CI engine system 100, such as the CI engine 102, the fuel system 108, and associated sensors as described herein. The engine control module 118 electronically controls the fuel injectors 122 to inject fuel into the cylinders 120. The intake valves 124 selectively open and close to enable air to enter the cylinders 120. A camshaft (not shown) regulates intake valve positions. The pistons compress the air/fuel mixture within the cylinders 120 to cause combustion.

The sensors 128 are situated such that combustion noise signals may be generated. For example, the sensors 128 may be cylinder pressure sensors and/or cylinder temperature sensors. Furthermore, the sensors 128 may be accelerometers (i.e. knock sensors) located in the engine block 102, a cylinder head 120, or the intake manifold 106.

The combustion noise signals may be used by the engine control module 118 for fuel ignition quality (e.g. CN) measurement and diagnostics. The sensors 128 may generate combustion noise signals throughout an engine cycle. Furthermore, combustion noise signals over a particular crank angle after top dead center (aTDC) may be generated. Top dead center is the position of the pistons in which they are furthest from the crankshaft.

The pistons drive a crankshaft (not shown) to produce drive torque. Combustion exhaust within the cylinders 120 may be forced out through the exhaust manifold 110 and the outlet 112 when at least one of the exhaust valves 126 are in an open position. A camshaft (not shown) regulates exhaust valve positions.

The EGR line 114 and the EGR valve 116 may introduce exhaust gas into the intake manifold 106. The EGR valve 116 is mounted on the intake manifold 106 and the EGR line 114 extends from the exhaust manifold 110 to the EGR valve 116. The EGR line 114 transfers exhaust gas from the exhaust manifold 110 to the EGR valve 116. The engine control module 118 electronically controls a position of the EGR valve 116.

Figure 2:
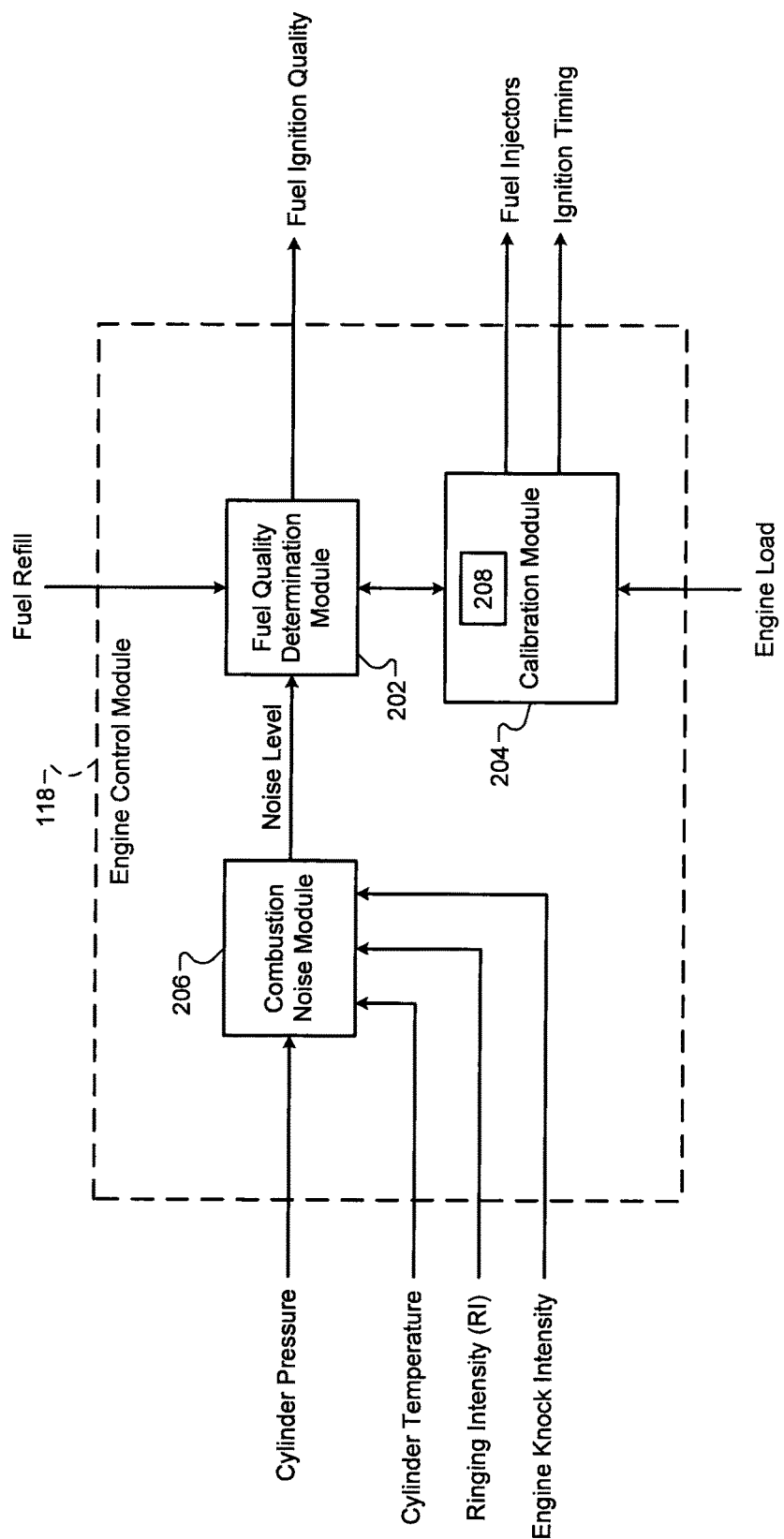
FIG. 2 is a functional block diagram of an engine control module according to the present disclosure.

Referring now to FIG. 2, the engine control module 118 is shown. The engine control module 118 includes a fuel quality determination module 202, a calibration module 204, and a combustion noise module 206. The combustion noise module 206 may further include a lookup table 208 that includes predetermined (e.g. expected) combustion noise levels for different ignition quality fuels and different combustion settings.

The fuel quality determination module 202 receives a fuel refill signal from a fuel level sensor (not shown) that is located within a fuel tank (not shown). The fuel refill signal indicates whether the fuel tank has been refilled with new fuel. When the fuel refill signal indicates that the fuel tank has been refilled with the new fuel, the fuel quality determination module 202 starts a process of detecting the ignition quality of the fuel.

The fuel quality determination module 202 selects a combustion setting from the calibration module 204 based on an engine load. Combustion settings are based on predetermined optimal settings corresponding to a particular fuel ignition quality. For example, the optimal settings may include a crank angle window, an engine speed, a fuel rail pressure, a pilot injection quantity (i.e. an amount of fuel injection), and a pilot injection timing (i.e. a timing of fuel injection).

For example, there may be three different combustion modes stored in the calibration module 204, each having different combustion settings for different CN fuels. In other words, the combustion modes may depend on loads of the CI engine 102 (i.e. engine load). For example, the combustion modes may include early main injection timing for a light load, late main injection timing for a medium load (i.e. conventional mode), and late main injection timing with post injection for a high load. However, it is not necessary to run the CI engine system 100 using each of the different combustion settings in order to determine the fuel ignition quality. In other words, any one of the different combustion settings may be selected.

After the combustion setting is selected, the engine control module 118 operates the CI engine system 100 for at least one cycle. During operation, the combustion noise module 206 receives cylinder pressure data (e.g. a cylinder pressure trace). For example, the combustion noise module 206 may receive the cylinder pressure data from the pressure sensors 128 in the cylinder 120. The combustion noise module 206 may also receive other combustion noise metrics such as cylinder temperature, engine knock, and ringing intensity. The combustion noise module 206 generates a combustion noise level based on the cylinder pressure data and/or the other combustion noise metrics.

In one implementation, the combustion noise module 206 may determine the combustion noise level by either digital or analog processing of cylinder pressure signals. For example, fast Fourier transform (FFT) filtering, unification filtering (U-filtering), analog filtering (A-filtering), or a root-mean-square (RMS) power calculation may be used to measure pressure traces.

In another implementation, the combustion noise module 206 may determine the combustion noise level by using ringing intensity (RI). RI is derived from a wave equation, and includes different combustion parameters, as shown below:

$$RI = \frac{1}{2 \times \gamma} \frac{\left(\beta \times \left(\frac{dP}{dt}\right)_{max}\right)^2}{P_{max}} \times \sqrt{\gamma \times R \times T_{max}} \ (MW/m^2),$$

where $\gamma$ represents a specific gas constant. $\beta$ represents a correction coefficient for different combustion systems. $(dP/dt)_{max}$ represents the maximum pressure rise rate. $P_{max}$ represents the maximum pressure. R represents a gas constant. $T_{max}$ represents the maximum gas temperature.

Ringing intensity (RI) may be used to determine combustion noise level. For example, RI contains the maximum pressure rise rate in the numerator, which may be used to generate the combustion noise level. However, the above RI measurement uses dimensional combustion parameters (i.e. dP/dt), which could be problematic due to issues of pressure sensor gain or bias (i.e. inaccurate measurements). Therefore, a new, modified RI may be used for real-time combustion noise level measurement by substituting mostly non-dimensional parameters, as shown below:

$$\text{Modified\_RI} = \frac{1}{2 \times \gamma} \frac{(\beta 1 \times PRDR_{max})^2}{FPR} \times \sqrt{\gamma \times R \times MAT} \quad (MW/m^2),$$

where $\gamma$ represents the specific gas constant. $\beta 1$ represents a correction coefficient for different combustion systems. $PRDR_{max}$ represents a dimensionless pressure-ratio difference rate, which corresponds to the heat release rate. FPR represents a final pressure ratio, which is a pressure ratio at a crank angle after completion of heat release (i.e. 65 or 90° aTDC depending on combustion mode). MAT represents manifold air temperature; however, MAT actually represents a manifold temperature of air and EGR mixture when EGR is used because exhaust gas is routed back into the intake manifold. MAT is the only dimensional parameter in the modified RI, and may be measured. MAT is typically an existing measured or known parameter in standard engine control systems.

In yet another implementation, the combustion noise module 206 may determine the combustion noise level by measuring cylinder knocking using a piezoelectric accelerometer (i.e. a knock sensor, or KS). Knock is a term for the high-frequency vibrations that are caused by combustion. Knock may be roughly equivalent to the combustion noise level. Furthermore, the high-frequency vibrations coincide with both peak heat release rate and maximum pressure rise rate, both of which may be used to determine the combustion noise level. Typically, knock is measured and minimized in order to reduce engine noise (one of the main problems with CI engines). Here, knock may be used to determine the ignition quality of fuel.

The fuel quality determination module 202 receives the combustion noise level from the combustion noise module 206. The fuel quality determination module 202 compares the combustion noise level to one of the predetermined combustion noise levels. The predetermined combustion noise level may correspond to the selected combustion setting from the calibration module 204 and/or the lookup table 208.

If the difference between the combustion noise level and the expected combustion noise level is less than a predetermined threshold value, the fuel quality determination module 202 may determine that the fuel ignition quality (CN) is the same as the ignition quality corresponding to the selected combustion setting. In other words, the fuel quality determination module 202 will continue operating the fuel injectors 122 using the selected combustion setting.

However, if the difference between the combustion noise level and the expected combustion noise level is greater than the predetermined threshold value, the fuel quality determination module 202 may compare the combustion noise level to a new (i.e. different) predetermined combustion noise level corresponding to a different quality fuel. In other words, if the combustion noise level is higher than the new predetermined combustion noise level, then the fuel ignition quality is lower than expected. Conversely, if the combustion noise level is lower than the new predetermined combustion noise level, then the fuel ignition quality is higher than expected. Therefore, the fuel quality determination module 202 may continue comparing the combustion noise level with predetermined combustion noise levels until a difference is less than the predetermined threshold. The fuel quality determination module 202 may output the determined fuel ignition quality once the process is completed.

Additionally, the calibration module 204 may adjust the main injection timing based on the determined fuel ignition quality. However, first the engine control module 118 will check to see whether the EGR system (not shown) and the fuel injectors 122 are functioning properly. If either the EGR system or the fuel injectors 122 are malfunctioning, the combustion noise level measurement may be inaccurate. However, if both are functioning properly, the calibration module 204 will adjust the combustion setting based on the fuel ignition quality.

If the determined fuel ignition quality is lower than originally expected, main injection timing is advanced (i.e., the combustion phasing targets are advanced, or decreased) by the calibration module 204. Conversely, if the determined fuel ignition quality is higher than originally expected, main injection timing is retarded (i.e., the combustion phasing targets are retarded, or increased) by the calibration module 204.

Figure 3:
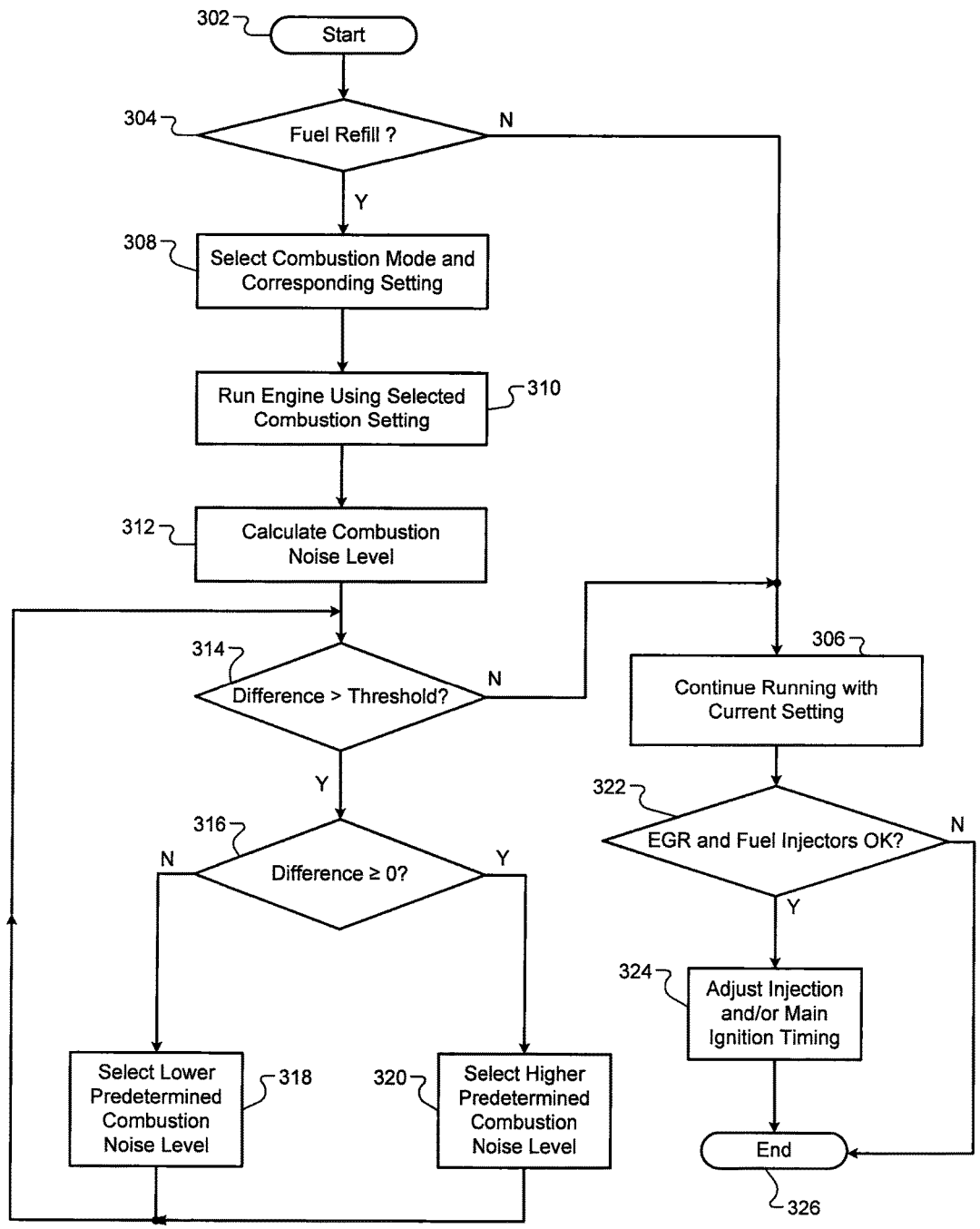
FIG. 3 is a flowchart illustrating steps performed by the engine control module according to the present disclosure.

Referring now to FIG. 3, a flowchart depicting steps performed by the engine control module 118 begins in step 302. In step 304, the engine control module 118 determines whether a fuel refill event has occurred. If no, control proceeds to step 306. If yes, control proceeds to step 308.

In step 306, the engine control module 118 continues operating the CI engine system 100 with the selected combustion setting because the fuel ignition quality has not changed. The fuel quality may not have changed because a refuel event has not occurred or the same ignition quality fuel was used to refill the fuel tank.

In step 308, the engine control module 118 selects a combustion mode and combustion setting from the calibration module 204. In step 310, the engine control module 118 operates the CI engine system 100 for at least one engine cycle using the selected combustion setting. In step 312, the engine control module 118 determines the combustion noise level based on cylinder pressure and/or other combustion noise metrics.

In step 314, the engine control module 118 determines whether the difference between the combustion noise level and the expected combustion noise level exceeds a predetermined threshold value. If no, control proceeds to step 306. If yes, control proceeds to step 316. In step 316, the engine control module 118 determines whether the difference is greater than or equal to zero. If yes, control proceeds to step 318. If no, control proceeds to step 320.

In step 318, the engine control module 118 selects a lower predetermined combustion noise level corresponding to a higher ignition quality fuel, and control returns to step 314. In step 320, the engine control module 118 selects a higher predetermined combustion noise level corresponding to a lower ignition quality fuel, and control returns to step 314.

In step 322, the engine control module 118 determines whether the EGR system and the fuel injectors are functioning properly. If no, the process ends because measurements may be inaccurate. If yes, control proceeds to step 324. In step 324, the engine control module 118 adjusts fuel injection and/or main ignition timing based on the determined fuel ignition quality, and control ends in step 326.

Referring now to FIGS. 4A and 4B, actual test data illustrating relationships between heat release rate and crank angle degree after top dead center (aTDC) is depicted both with and without the use of a pilot injection for three different cetane number (CN) fuels. The use of a pilot injection amplifies the effect of fuel ignition quality on combustion process (i.e. peak heat release rates), as can be seen in FIG. 4B. In other words, higher ignition quality fuel starts combustion sooner and more rapidly during pilot combustion than lower ignition quality fuel. This leads to more fuel burning during pilot combustion and less fuel burning during main combustion, which results in a lower peak heat release rate.

The use of a pilot injection also advances the start of the main combustion, which leads to more cooling loss and in turn, less heat release. Thus, there are more clear differences in peak heat release rates among different ignition quality fuels, which are related to combustion noise level. In other words, the more clear differences make measuring the combustion noise level easier.

Therefore, a larger pilot quantity is preferred for early main injection timing and a smaller quantity for late main injection timing. Furthermore, advanced main injection timing prefers larger amounts of pilot quantities (up to a certain upper bound) to increase combustion noise resolutions for different ignition quality fuels.

Figure 5:
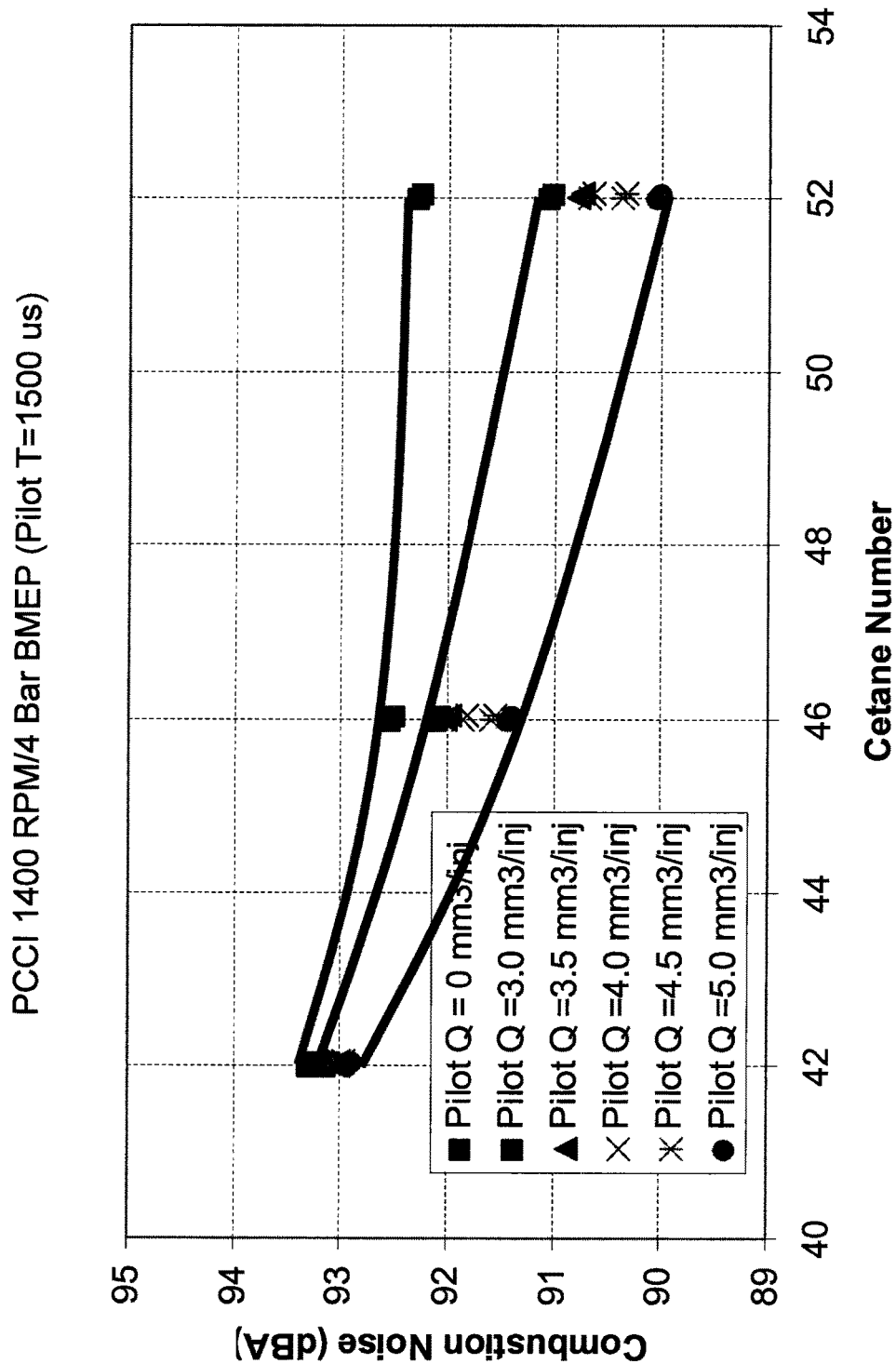
FIG. 5 is a graph illustrating a combustion noise as a function of a varied CN for six different pilot quantities according to the present disclosure.

Referring now to FIG. 5, actual test data illustrating a relationship between combustion noise and fuel ignition quality is shown for six different pilot injection quantities. Combustion noise shows an approximate linear relationship with fuel ignition quality when a pilot injection is used. However, when a pilot injection is not used, the relationship deviates and shows no significant differences among the different ignition quality fuels, especially at higher ignition quality fuels. Therefore, this further illustrates the advantages of using pilot injection to enhance the fuel ignition quality (CN) determination.

Figures 6, 7:
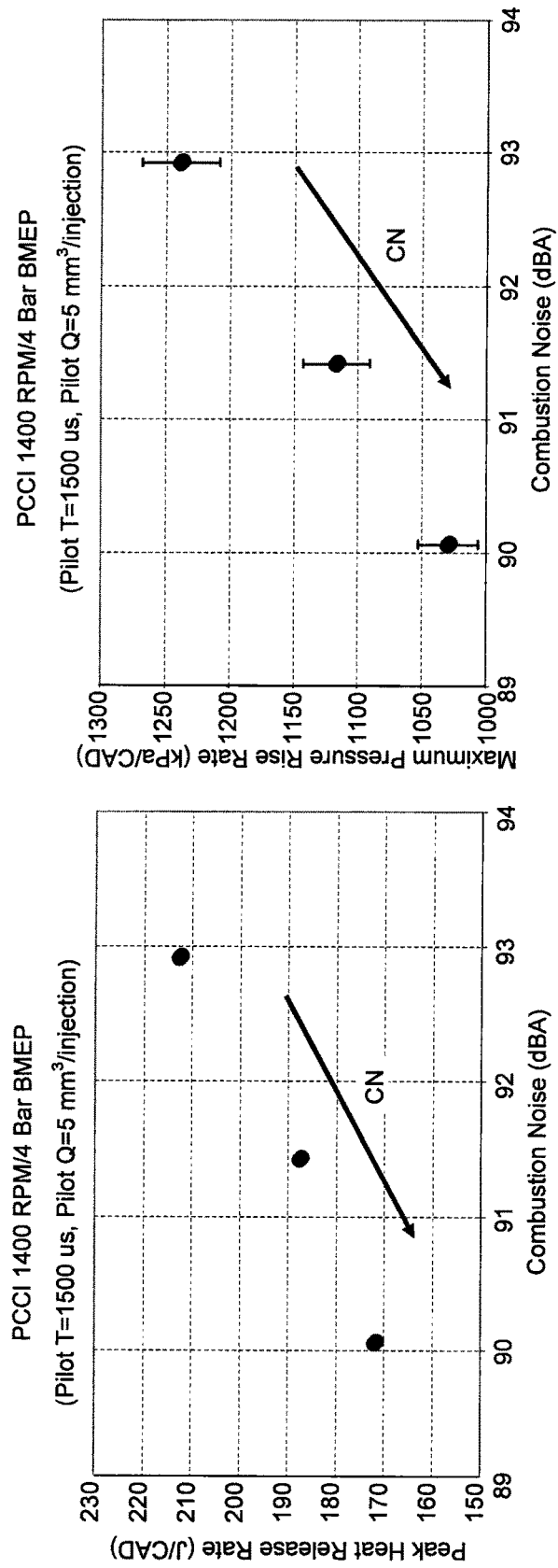
FIG. 6 is a graph illustrating peak heat release rate as a function of a combustion noise for three CI fuels with different CNs according to the present disclosure.
FIG. 7 is a graph illustrating maximum pressure rise rate as a function of a combustion noise for three CI fuels with different CNs according to the present disclosure.
Figure 8A:
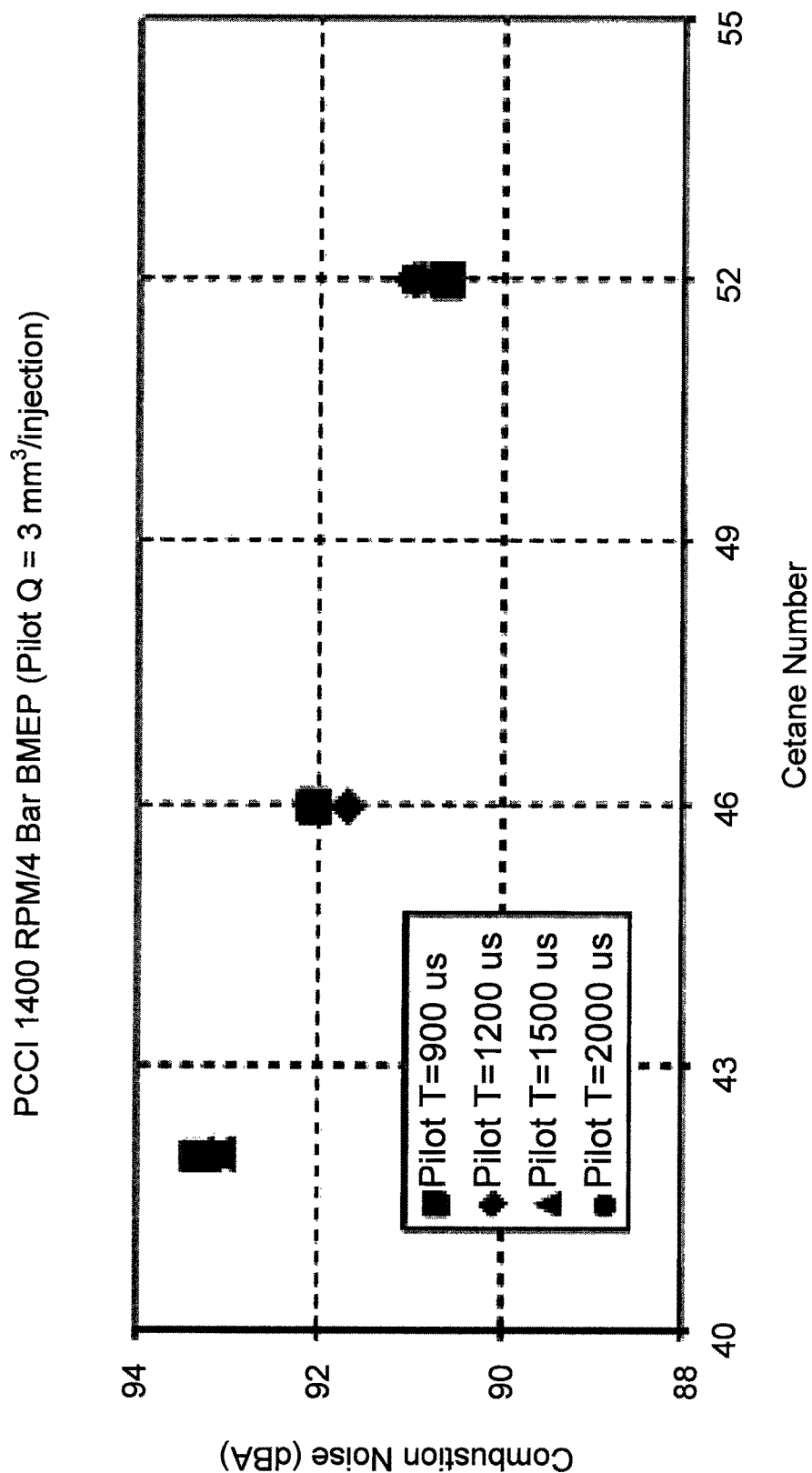
FIGS. 8A-8D are graphs illustrating combustion noise as a function of CN for four different pilot timings, each graph representing a different pilot quantity, according to the present disclosure.
Figure 8B:
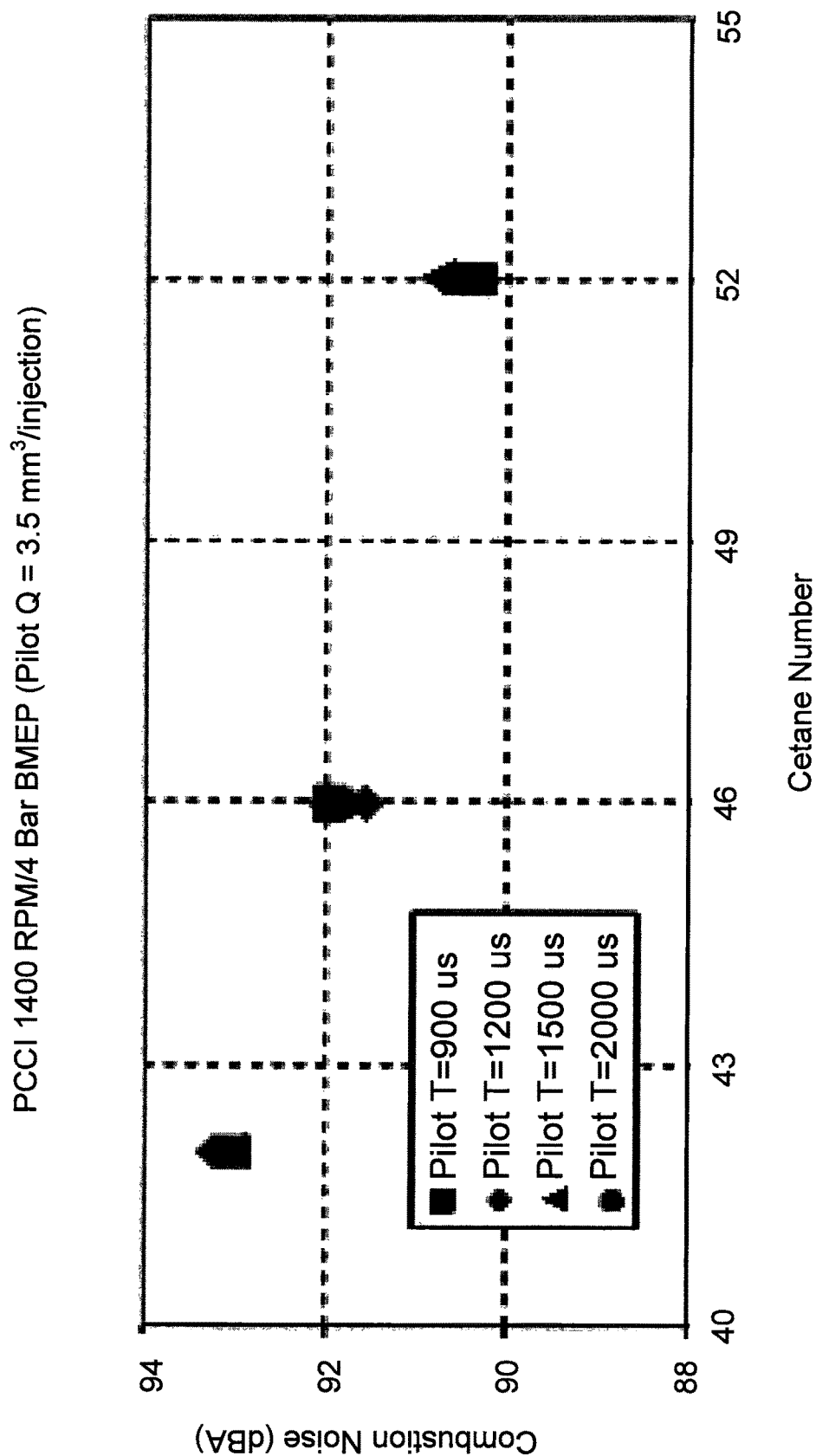
Figure 8C:
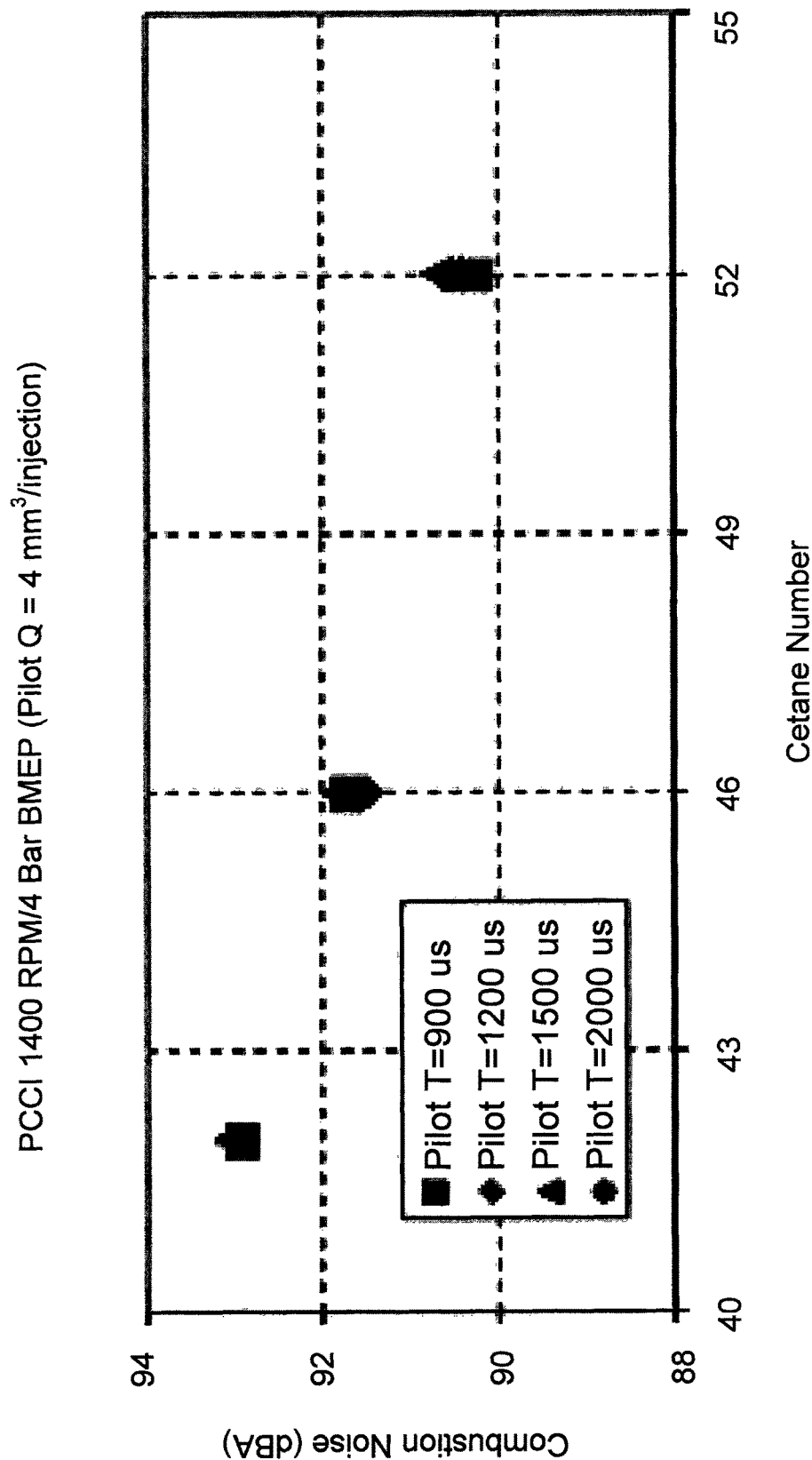
Figure 8D:
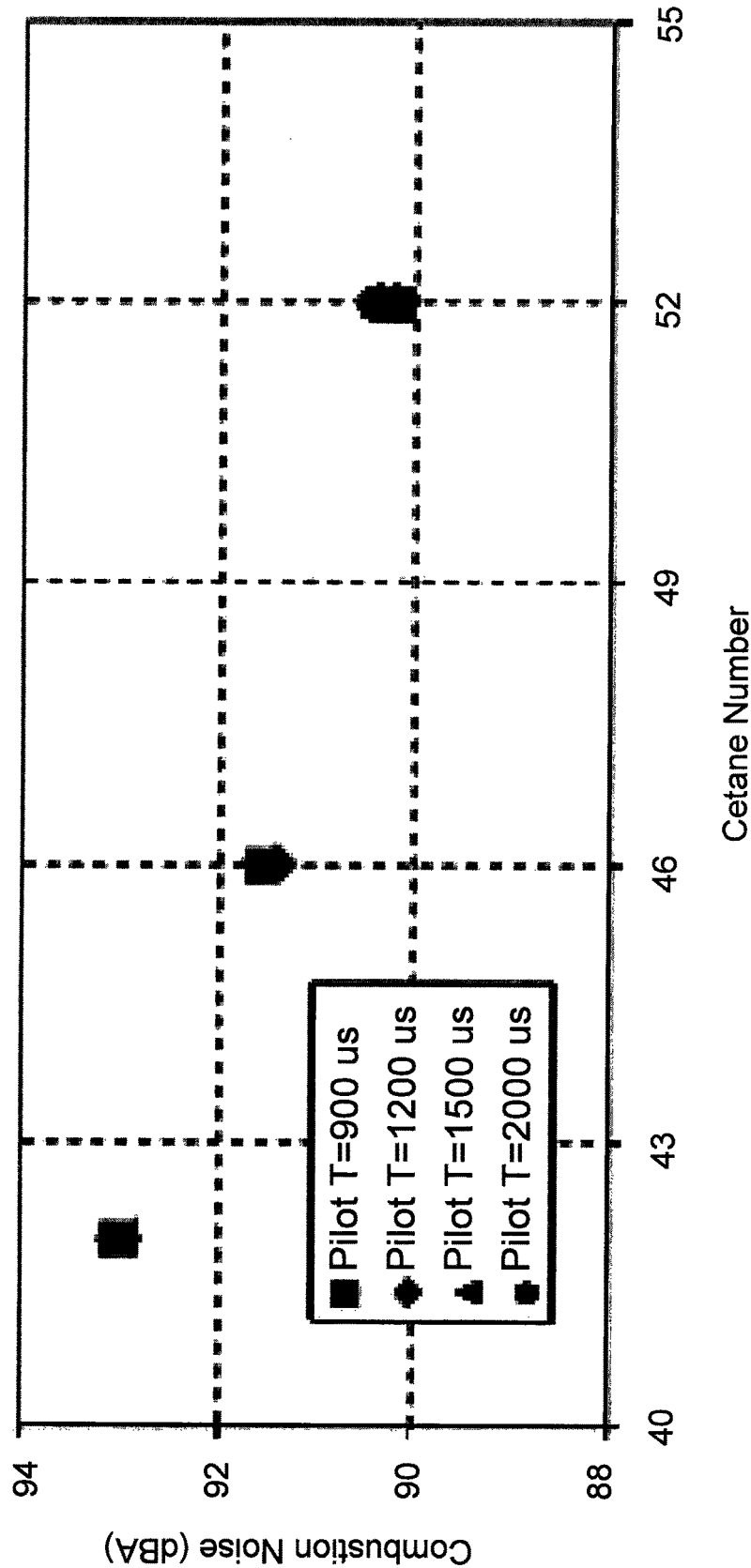

Referring now to FIGS. 6 and 7, actual test data illustrating relationships between peak heat release rate and combustion noise and between maximum pressure rise rate and combustion noise is shown for three different CN fuels. Combustion noise has a linear relationship with both peak heat release rate and maximum pressure rise rate. In addition, fuel ignition quality has an inverse linear relationship with combustion noise, peak heat release rate, and maximum pressure rise rate. Therefore, the use of any of these combustion noise signals may be used to determine fuel ignition quality.

Referring now to FIGS. 8A-8D and FIG. 9, actual test data illustrating relationships between combustion noise and fuel ignition quality is shown for different pilot separation times and different pilot quantities. Combustion noise shows a linear relationship with fuel ignition quality for all pilot quantities. In other words, combustion noise is approximately the same for all pilot injection times for the same ignition quality fuel due to almost the same peak heat release rates. This is because main combustion starts after completing pilot combustion of a small pilot quantity, which does not contribute much to torque forming. In other words, the start of main combustion is only slightly impacted by the pilot combustion, but the rest of the main combustion is not noticeably impacted.

Figure 9:
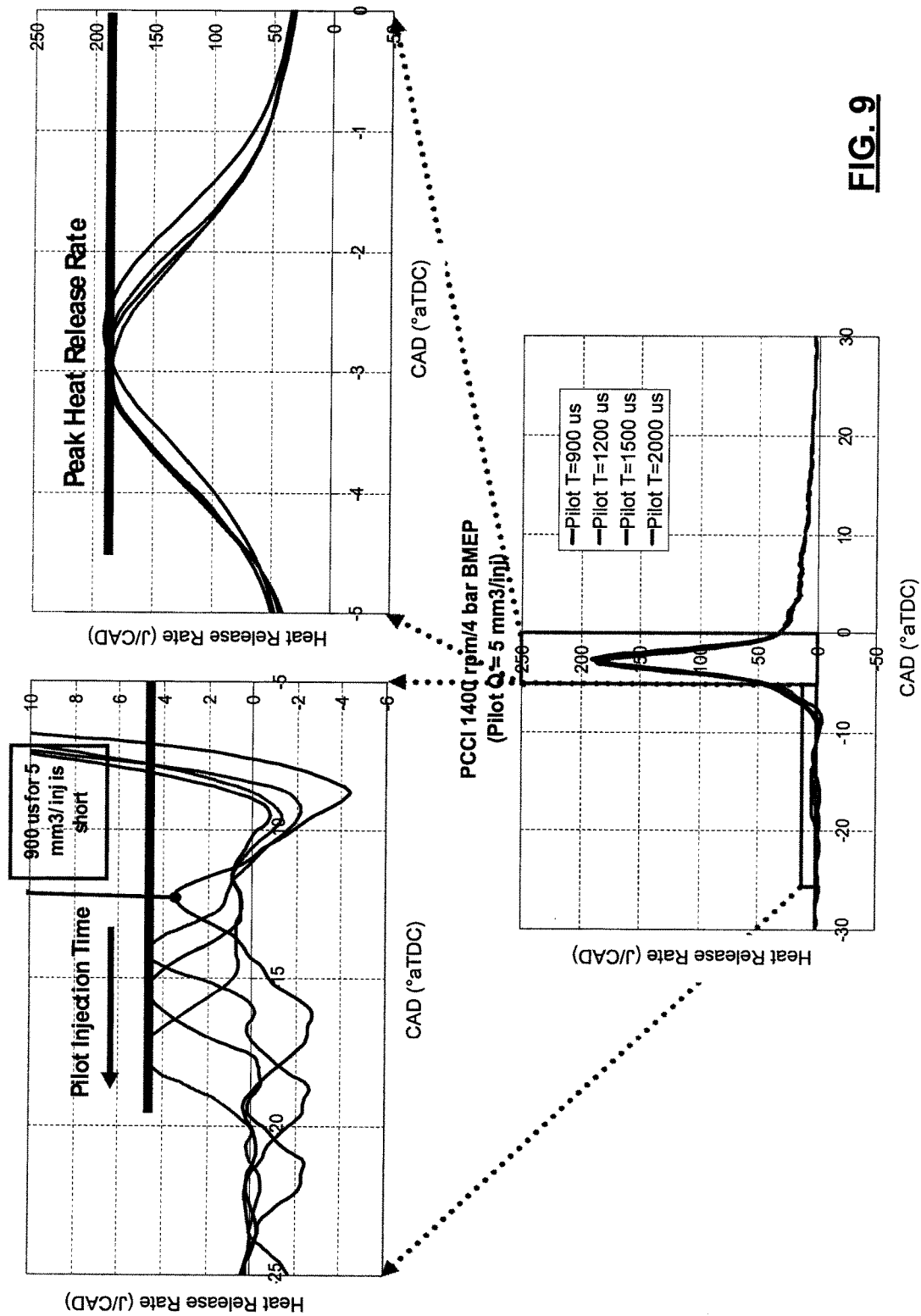
FIG. 9 is a graph illustrating a heat release rate as a function of a crank angle degree aTDC for four different pilot timings according to the present disclosure.

Referring now to FIG. 9, in the case of pilot separation time of 900 µs, main injection starts too early after the pilot injection and pilot combustion cannot be completed, which causes more fuel to burn during the main combustion. However, this observation is not true for all operating conditions. In other words, retarded main injection timing would have more effect on pilot separation time than it would have on combustion noise.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. An engine control system comprising:
   an engine calibration module that:
      selects one of N cetane number (CN) values, wherein N is an integer greater than one;
      sets fuel injection timing based on the selected one of the N CN values; and
      controls a pilot fuel injection based on the selected one of the N CN values;
   a combustion noise module that generates a combustion noise signal indicative of a combustion noise level within a cylinder of a compression ignition (CI) engine based on cylinder pressure in the CI engine after the pilot fuel injection and during combustion; and
   a fuel quality determination module that:
      determines a difference between the combustion noise level and a predetermined combustion noise level corresponding to the selected one of the N CN values; and
      determines whether an actual CN value of fuel combusted by the CI engine corresponds to the selected one of the N CN values based on the difference.

2. The engine control system of claim 1 wherein the fuel quality determination module determines the actual CN value of fuel combusted by the CI engine when a fuel tank is refilled with fuel.

3. The engine control system of claim 1, wherein the engine calibration module controls a quantity of the pilot fuel injection based on a timing of a main fuel injection, wherein the pilot fuel injection quantity increases as the main fuel injection timing advances.

4. The engine control system of claim 1 wherein the combustion noise signal is based on a pressure signal generated by a pressure sensor in the cylinder.

5. The engine control system of claim 1 wherein the combustion noise signal is based on a temperature generated by a temperature sensor in the cylinder.

6. The engine control system of claim 1 wherein the combustion noise signal is based on a peak heat release rate determined based on an engine knock intensity generated by a knock sensor in the CI engine.

7. The engine control system of claim 1 wherein the combustion noise signal is based on a ringing intensity (RI) of the cylinder.

8. The engine control system of claim 1 wherein the fuel quality module determines whether the actual CN value of fuel combusted by the CI engine corresponds to the selected one of the N CN values based on an absolute value of the difference between the combustion noise level and the predetermined combustion noise level.

9. The engine control system of claim 1, wherein the fuel quality determination module determines that the actual CN value of fuel combusted by the CI engine is equal to the selected one of the N CN values when the difference between the combustion noise level and the predetermined combustion noise level is less than or equal to a predetermined value.

10. The engine control system of claim 1 wherein the engine calibration module sets the fuel injection timing based on a status of an exhaust gas recirculation (EGR) system and a status of a plurality of fuel injectors.

11. A method comprising:
selecting one of N cetane number (CN) values, wherein N is an integer greater than one;
setting fuel injection timing based on the selected one of the N CN values;
controlling a pilot fuel injection based on the selected one of the N CN values;
generating a combustion noise signal indicative of a combustion noise level within a cylinder of a compression ignition (CI) engine based on cylinder pressure in the CI engine after the pilot fuel injection and during combustion;
determining a difference between the combustion noise level and a predetermined combustion noise level corresponding to the selected one of the N CN values; and
determining whether an actual CN value of fuel combusted by the CI engine corresponds to the selected one of the N CN values based on the difference.

12. The method of claim 11, further comprising determining the actual CN value of fuel combusted by the CI engine when a fuel tank is refilled with fuel.

13. The method of claim 11, further comprising:
controlling a quantity of the pilot fuel injection based on a timing of a main fuel injection, wherein the pilot fuel injection quantity increases as the main fuel injection timing advances.

14. The method of claim 11, wherein the combustion noise signal is based on a pressure signal generated by a pressure sensor in the cylinder.

15. The method of claim 11, wherein the combustion noise signal is based on a temperature generated by a temperature sensor in the cylinder.

16. The method of claim 11, wherein the combustion noise signal is based on a peak heat release rate determined based on an engine knock intensity generated by a knock sensor in the CI engine.

17. The method of claim 11, wherein the combustion noise signal is based on a ringing intensity (RI) of the cylinder.

18. The method of claim 11 further comprising determining whether the actual CN value of fuel combusted by the CI engine corresponds to the selected one of the N CN values based on an absolute value of the difference between the combustion noise signal level and the predetermined combustion noise level.

19. The method of claim 11, further comprising determining that the actual CN value of fuel combusted by the CI engine is equal to the selected one of the N CN values when the difference between the combustion noise level and the predetermined combustion noise level is less than or equal to a predetermined value.

20. The method of claim 11, wherein the setting fuel injection timing is based on a status of an exhaust gas recirculation (EGR) system and a status of a plurality of fuel injectors.

21. The engine control system of claim 4, wherein the combustion noise signal is generated by processing the pressure signal using at least one of (i) unification filtering (U-Filtering), (ii) analog filtering (A-Filtering), and (iii) a root-mean-square (RMS).

22. The engine control system of claim 4, wherein the combustion noise signal is generated by processing the pressure signal using at least one of (i) a fast Fourier transform (FFT) and (ii) A-Filtering.

23. The engine control system of claim 7, wherein the RI is based on a maximum pressure rise rate within the cylinder, a peak pressure within the cylinder, and a maximum mean cylinder temperature.

24. The method of claim 14, wherein the combustion noise signal is generated by processing the pressure signal using at least one of (i) U-Filtering, (ii) A-Filtering, and (iii) an RMS.

25. The method of claim 14, wherein the combustion noise signal is generated by processing the pressure signal using at least one of (i) an FFT and (ii) A-Filtering.

26. The method of claim 17, wherein the RI is based on a maximum pressure rise rate within the cylinder, a peak pressure within the cylinder, and a maximum mean cylinder temperature.

* * * * *